(12) United States Patent
Brady et al.

(10) Patent No.: US 6,201,474 B1
(45) Date of Patent: Mar. 13, 2001

(54) MAGNETIC TAPE STORAGE MEDIA HAVING RFID TRANSPONDERS

(75) Inventors: Michael John Brady, Brewster; Dah-Weih Duan, Yorktown Heights; Venkata S. R. Kodukula, Peekstill, all of NY (US)

(73) Assignee: Intermec IP Corp., Woodland Hills, CA (US)

( * ) Notice: Subject to any disclaimer, the term of this patent is extended or adjusted under 35 U.S.C. 154(b) by 0 days.

(21) Appl. No.: 09/195,528

(22) Filed: Nov. 18, 1998

Related U.S. Application Data
(60) Provisional application No. 60/105,230, filed on Oct. 21, 1998.

(51) Int. Cl.$^7$ .................................................. G08B 13/14
(52) U.S. Cl. ............................ 340/572.8; 340/572.7; 343/720; 235/381; 235/487
(58) Field of Search ............................. 340/572.1, 572.7, 340/572.8, 573.1, 568.1; 343/720, 894; 242/348.4, 348; 455/193.1; 235/381, 487

(56) References Cited

U.S. PATENT DOCUMENTS

| | | | |
|---|---|---|---|
| 4,075,632 | 2/1978 | Baldwin et al. | 342/51 |
| 4,360,810 | 11/1982 | Landt | 342/44 |
| 4,673,923 | * 6/1987 | Boscoe et al. | 340/572.8 |
| 4,692,746 | * 9/1987 | Budin et al. | 340/572.7 |
| 4,782,345 | 11/1988 | Landt | 343/727 |
| 4,786,907 | 11/1988 | Koelle | 342/51 |
| 4,816,389 | 3/1989 | Sansonetti et al. | 435/6 |
| 4,835,377 | 5/1989 | Brown | 235/492 |
| 4,853,705 | 8/1989 | Landt | 343/803 |
| 4,864,158 | 9/1989 | Koelle et al. | 327/31 |
| 4,888,591 | 12/1989 | Landt et al. | 342/44 |
| 4,999,636 | 3/1991 | Landt et al. | 342/90 |
| 5,028,766 | * 7/1991 | Shah | 235/381 |
| 5,030,807 | 7/1991 | Landt et al. | 235/375 |
| 5,055,659 | 10/1991 | Hendrick et al. | 340/10.51 |
| 5,081,446 | * 1/1992 | Gill et al. | 340/572.8 |
| 5,218,342 | * 6/1993 | McCrackin | 340/572.8 |
| 5,438,321 | * 8/1995 | Bernard et al. | 340/573.1 |
| 5,479,160 | 12/1995 | Koelle | 340/825.7 |
| 5,485,520 | 1/1996 | Chaum et al. | 705/74 |
| 5,504,485 | 4/1996 | Landt et al. | 342/42 |
| 5,510,795 | 4/1996 | Koelle | 342/114 |
| 5,521,601 | 5/1996 | Kandlur et al. | 342/44 |
| 5,528,222 | * 6/1996 | Moskowitz et al. | 340/572.7 |
| 5,538,803 | 7/1996 | Gambino et al. | 428/694 TM |
| 5,550,547 | 8/1996 | Chan et al. | 342/42 |
| 5,552,778 | 9/1996 | Schrott et al. | 340/825.34 |

(List continued on next page.)

FOREIGN PATENT DOCUMENTS

| | | |
|---|---|---|
| 0 294 963 | 12/1988 | (EP) . |
| 0 646 983 | 4/1995 | (EP) . |
| WO 98/16070 | 4/1998 | (WO) . |

OTHER PUBLICATIONS

"Multifunction Credit Card Package" IBM Technical Disclosure Bulletin, vol. 38, No. 08, Aug. 1995, p. 17.

"A Low–Power CMOS Integrated Circuit for Field–Powered Radio Frequency Identification Tag" by Friedman et al., 1997 IEEE International Solid State Circuits Conference, Paper SA 17.5, pp. 294, 295, 474.

*Primary Examiner*—Benjamin C. Lee
(74) *Attorney, Agent, or Firm*—O'Melveny & Myers LLP

(57) ABSTRACT

A magnetic tape information storage media includes a cassette housing having one or more spools for holding a length of magnetic tape and an integral radio frequency identification (RFID) transponder. The RFID transponder may be utilized by an external system to provide functions such as, automated sale, rental, or loan of the media, authentication of the media, indexing of information recorded to the media, enablement/disablement of playback of the media, recording of the number of times the media has been played, inventory, and the like.

7 Claims, 10 Drawing Sheets

U.S. PATENT DOCUMENTS

| | | | |
|---|---|---|---|
| 5,554,974 | 9/1996 | Brady et al. | 340/572.6 |
| 5,563,583 | 10/1996 | Brady et al. | 340/572.2 |
| 5,565,847 | 10/1996 | Gambino et al. | 340/572.6 |
| 5,606,323 | 2/1997 | Heinrich et al. | 340/10.34 |
| 5,635,693 | 6/1997 | Benson et al. | 340/10.33 |
| 5,673,037 | 9/1997 | Cesar et al. | 340/10.32 |
| 5,680,106 | 10/1997 | Schrott et al. | 340/10.33 |
| 5,682,143 | 10/1997 | Brady et al. | 340/572.7 |
| 5,729,201 | 3/1998 | Jahnes et al. | 340/572.1 |
| 5,729,697 | 3/1998 | Schkolnick et al. | 705/23 |
| 5,736,929 | 4/1998 | Schrott et al. | 340/572.1 |
| 5,737,710 | 4/1998 | Anthonyson | 701/1 |
| 5,739,754 | 4/1998 | Schrott et al. | 340/572.2 |
| 5,767,789 | 6/1998 | Afzali-Ardakani et al. | 340/10.1 |
| 5,771,003 * | 6/1998 | Seymour | 340/568.1 |
| 5,771,021 | 6/1998 | Veghte et al. | 343/700 MS |
| 5,777,561 | 7/1998 | Chieu et al. | 340/10.32 |
| 5,786,626 | 7/1998 | Brady et al. | 257/673 |
| 5,812,065 | 9/1998 | Schrott et al. | 340/10.34 |
| 5,821,859 | 10/1998 | Schrott et al. | 340/572.6 |
| 5,825,329 | 10/1998 | Veghte et al. | 343/700 MS |
| 5,826,328 | 10/1998 | Brady et al. | 29/827 |
| 5,828,318 | 10/1998 | Cesar | 340/825.69 |
| 5,828,693 | 10/1998 | Mays et al. | 375/136 |
| 5,831,532 | 11/1998 | Gambino et al. | 340/572.1 |
| 5,850,181 | 12/1998 | Heinrich et al. | 340/572.1 |
| 5,850,187 | 12/1998 | Carrender et al. | 340/10.6 |
| 5,874,902 | 2/1999 | Heinrich et al. | 340/10.51 |
| 5,934,592 * | 8/1999 | Makino | 242/348.4 |
| 5,963,134 * | 10/1999 | Bowers et al. | 340/572.1 |
| 5,970,398 * | 10/1999 | Tuttle | 455/193.1 |
| 5,971,281 * | 10/1999 | Frary et al. | 235/487 |

* cited by examiner

MAGNETIC TAPE STORAGE MEDIA HAVING RFID TRANSPONDERS

CROSS-REFERENCE TO RELATED APPLICATIONS

The present application claims the benefit under 35 U.S.C. § 119(e) of U.S. Provisional Application Ser. No. 60/105,230, filed Oct. 21, 1998. Said U.S. Provisional Application Ser. No. 60/105,230 is herein incorporated by reference in its entirety.

INCORPORATION BY REFERENCE

The following U.S. patents and patent applications are hereby incorporated herein by reference in their entirety:

U.S. Patents

| U.S. Pat. No. | Issue Date | Filing Date | Attorney Docket No |
|---|---|---|---|
| 5,521,601 | 05/28/96 | 04/21/95 | YO995-0088 |
| 5,528,222 | 06/18/96 | 09/09/94 | YO994-180 |
| 5,538,803 | 07/23/96 | 11/23/94 | YO994-0073 |
| 5,550,547 | 08/27/96 | 09/12/94 | YO994-185 |
| 5,552,778 | 09/03/96 | 11/23/94 | YO994-0232 |
| 5,554,974 | 09/10/96 | 11/23/94 | YO994-0071 |
| 5,563,583 | 10/08/96 | 11/23/94 | YO994-070 |
| 5,565,847 | 10/15/96 | 11/23/94 | YO994-0072 |
| 5,606,323 | 02/25/97 | 08/31/95 | YO995-157 |
| 5,635,693 | 06/03/97 | 02/02/95 | YO994-0215 |
| 5,673,037 | 09/30/97 | 09/09/94 | YO994-184 |
| 5,680,106 | 10/21/97 | 10/27/95 | YO995-0219 |
| 5,682,143 | 10/28/97 | 09/09/94 | YO994-170 |
| 5,729,201 | 03/17/98 | 06/29/95 | YO995-109 |
| 5,729,697 | 03/17/98 | 04/24/95 | YO995-076 |
| 5,736,929 | 04/07/98 | 06/07/96 | YO996-085 |
| 5,739,754 | 04/14/98 | 07/29/96 | YO996-115 |
| 5,767,789 | 06/16/98 | 08/31/95 | YO994-213 |
| 5,777,561 | 07/07/98 | 09/30/96 | YO996-178 |
| 5,786,626 | 07/28/98 | 03/25/96 | YO996-031 |
| 5,812,065 | 09/22/98 | 12/08/95 | YO995-124X |
| 5,821,859 | 10/13/98 | 06/07/96 | YO996-084 |

U.S. NonProvisional Patent Applications

| Application No | Filing Date | Attorney Docket No |
|---|---|---|
| 08/681,741 | 07/29/96 | YO996-037 |
| 08/626,820 | 04/03/96 | YO995-158 |
| 08/646,539 | 05/08/96 | YO996-068 |
| 08/681,741 | 07/29/96 | YO996-037 |
| 08/694,606 | 08/09/96 | YO995-218 |
| 08/790,639 | 01/29/97 | YO997-024 |
| 08/790,640 | 01/29/97 | YO997-023 |
| 08/733,684 | 10/17/96 | YO996-195 |
| 08/862,149 | 05/23/97 | YO997-116 |
| 08/862,912 | 05/23/97 | YO997-115 |
| 08/862,913 | 05/23/97 | YO997-114 |
| 08/909,719 | 08/12/97 | YO995-109B (allowed) |
| 08/935,989 | 10/23/97 | YO997-310 |
| EH 372 217 464 US | 07/10/98 | YO896-0212R1 |
| 09/122,300 | 07/24/98 | YO897-259R |

U.S. Provisional Patent Applications

| Application No | Filing Date | Attorney Docket No |
|---|---|---|
| 60/068,373 | 12/22/97 | YO894-0206P1 |
| 60/073,102 | 01/30/98 | YO897-0028P1 |
| 60/074,605 | 02/13/98 | YO897-0259P1 |
| 60/077,879 | 03/13/98 | YO997-0038P1 |
| 60/078,100 | 03/16/98 | YO897-0657P1 |
| 60/078,226 | 03/16/98 | YO897-0658P1 |
| 60/078,287 | 03/17/98 | YO897-0661P1 |
| 60/091,350 | 07/01/98 | YO897-0259P2 |
| 60/078,304 | 03/17/98 | YO897-0662P1 |
| 60/090,637 | 06/25/98 | YO896-0212P2 |
| 60/091,352 | 07/01/98 | YO897-0673P1 |
| 60/091,350 | 07/01/98 | YO897-0259P2 |
| 60/093,088 | 07/16/98 | 38384P1 |
| 60/099,298 | 09/04/98 | YO894-0206P3 |
| EI 837 644 898 US | 09/17/98 | 38402P1 |

The following further documents are also incorporated herein by reference in their entirety:

IBM TECHNICAL DISCLOSURE BULLETIN

IBM Technical Disclosure Bulletin: Vol. 38 No 08, August 1995, page 17, "Multifunction Credit Card Package," by Brady, Moskowitz, and Murphy (published pseudonymously).

LITERATURE REFERENCE

D. Friedman, H. Heinrich, D. Duan, "A low-power CMOS integrated circuit for field-powered radio frequency identification (RFID) tags," 1997 Digest of Technical Papers of the IEEE International Solid-State Circuits Conference (ISSCC), San Francisco, Calif., February 1997.

| Application No | Filing Date | Attorney Docket No |
|---|---|---|
| PCT Published International Applications | | |
| PCT/GB96/00061 | 01/15/96 | UK 9-94-066 PCT |
| PCT/EP95/03703 | 10/20/95 | YO994-242 PCT |
| UK Published Application | | |
| 9710025.9 | 05/19/97 | YO9-96-084 |

FIELD OF THE INVENTION

The present invention relates generally to magnetic tape storage media, and more specifically to magnetic tape storage media having integral radio frequency identification (RFID) transponders and methods for their manufacture and use.

BACKGROUND OF THE INVENTION

Magnetic tape storage media (i.e., cassette tapes, video cassette tapes (VCR), micro-cassette tapes, computer backup tapes, etc.) provide high density, digital or analog storage of information and data in data storage, video, and audio applications. Such magnetic tape storage media are often utilized in a library or rental environment (i.e., a public library, corporate library, video rental store, etc.) where it is desirable to easily and efficiently track their loan or rental to patrons or customers and to maintain an accurate inventory of the number of and types of media possessed. In such applications, the media are typically prerecorded with information (i.e., movies, music, computer programs, games, etc.) which may be proprietary or which may be subject to copyright protection. Consequently, such media, when rented or loaned, may be subject to theft or unauthorized copying or counterfeiting.

Further, in such environments, personnel must be employed to check-out media to patrons or customers, check-in media returned by patrons and customers, return the media to their storage locations (i.e., re-shelve the media), and maintain an accurate inventory of the media (including notifying patrons or customers when media is overdue, locating missing or stolen media, etc.). For these reasons, operation of media library or rental facilities is presently somewhat labor intensive and costly.

Consequently, it would be advantageous to provide magnetic tape storage media (i.e., cassette tapes, video cassette tapes (VCR), computer backup tapes, etc.) which utilize radio frequency identification (RFID) for identification and tracking functions and for providing authentication of the media for prevention of theft or counterfeiting. It is also desirable to provide improved rental or loan systems and methods utilizing the media.

SUMMARY OF THE INVENTION

Accordingly, the present invention is directed to a novel magnetic tape storage media. The magnetic tape storage media includes a housing having a reel for holding a length of magnetic tape (e.g., a metallized polyester tape having a magnetic coating disposed thereon for storing magnetically encoded information) and an integral radio frequency identification (RFID) transponder. The RFID transponder includes a radio frequency identification integrated circuit (RFID IC) having memory for storing information coupled to an antenna. The RFID transponder may be utilized by an external system to provide functions such as, automated sale, rental, or loan of the media, authentication of the media, indexing of information recorded to the media, enablement/disablement of playback of the media, recording of the number of times the media has been played, inventory management, and the like.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which.

DETAILED DESCRIPTION OF THE INVENTION

Figure 1:
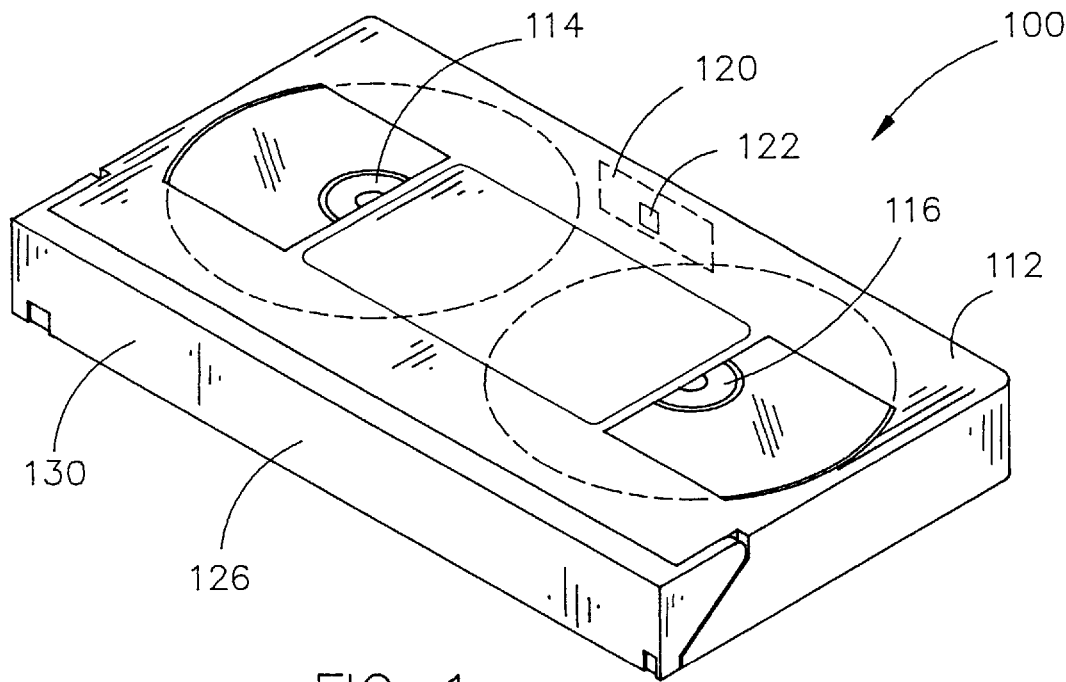
FIG. 1 is an isometric view of an exemplary magnetic tape storage medium comprising a video cassette tape having an integrated RFID transponder.

Reference will now be made in detail to the presently preferred embodiment of the invention, examples of which are illustrated in the accompanying drawings.

Referring now to FIGS. 1 through 7, exemplary magnetic tape storage media in accordance with the present invention are shown. The magnetic tape information storage media 100 include a generally rectangular housing 112 having at least one reel 114 & 116 for holding a length of magnetic tape 118. Magnetic tape 118 utilized by such media 100 typically comprises a thin strip of polyester film having a metallized coating (i.e., ferric oxide or the like) disposed thereon for storing magnetically encoded information. An integral radio frequency identification (RFID) transponder 120 is preferably contained within the housing 112 of the media 100. The RFID transponder 120 includes a radio frequency identification integrated circuit (RFID IC) 122 coupled to an antenna 124 for communicating with the an external RFID system (see FIGS. 8 through 14).

As shown in FIGS. 1 through 7, the magnetic tape information storage media 100 may, for example, be a conventional video cassette tape 126 complying with established formats or standards including, but not limited to, VHS (Video Home System), S-VHS (Super Video Home System), VHS-C (Video Home System Compact), S-VHS-C (Super Video Home System Compact), DV (Digital Video), Betacam, 8 mm, or Hi8). Such video cassette tapes 126 typically include a pair of spools or reels 114 & 116 for holding the magnetic tape 118. The spools 114 & 116 rotatably mounted within a chamber 128 formed in the housing 112. Preferably, the spools 114 & 116 (which are engaged and rotated by a drive mechanism within the video cassette recorder/player (VCR), camcorder, etc., not shown) alternatively serve as supply and take-up spools as the magnetic tape 118 is played (or recorded) and rewound. The housing 112 may further include a pivoting door 130 which allows access to the magnetic tape 118 for maintenance of the tape 118. Tape guides 132 & 134 and rollers 136 & 138 guide the tape 118 from the supply spool (e.g., spool 114) over the playing and/or recording heads of the VCR, camcorder, etc. (not shown) and onto the take-up spool (e.g., spool 116).

Alternatively, the magnetic tape information storage media 100 may be an audio cassette tape, computer data storage tape cartridge, micro cassette tape, etc. (not shown). Like video cassette tapes 126, such media are typically manufactured according to well established standards and formats and thus are well known to the art. As a result, it should be appreciated that substitution of such magnetic tape storage media for the media shown and described herein (i.e., video cassette tapes 126) by one of ordinary skill in the art would not depart from the scope and spirit of the invention.

In an exemplary embodiment, the RFID transponder 120 comprises a low power radio frequency identification integrated circuit (RFID IC) 122 including a signal processing section and an RF processing section (typically referred to as a front end) interconnected to an antenna 124. The front end includes interface circuitry which provides the facility to direct and accommodate the interrogation field energy for powering purposes in passive transponders and triggering of the transponder response. The front end can be any known front end design used with an antenna. Examples of front ends are well known. See, for example, the Hewlett Packard "Communications Components GaAs & Silicon Products Designer's Catalog" (i.e., page 2–15) which is herein incorporated by reference in its entirety. A typical front end is also described in U.S. patent application Ser. No. 08/790,639 to Duan, et al. filed Jan. 29, 1997 which is herein incorporated by reference in its entirety. The signal processing section may comprise control and processing circuitry and memory. Typical memory may include, for example, read-only memory (ROM), random access memory (RAM), and non-volatile programmable memory for data storage. Read only memory (ROM) may be used to accommodate security data and the transponder operating system instructions which, in conjunction with the processing circuitry provides functions such as response delay timing, data flow control and power supply switching. Random access memory (RAM) may be used to facilitate temporary data storage during transponder interrogation and response. Non-volatile programmable memory may be used to store transponder data so the data is retained when the transponder 120 is in a quiescent or power-saving "sleep" state. Data buffers may be provided to temporarily hold incoming data following demodulation and outgoing data for modulation and interface with the antenna 124.

The RFID transponder 120 may be field powered (e.g., passive). Field powered transponders collect power from the RF field generated by the interrogator or base station and convert the collected power to a dc voltage which is stored in a capacitor to provide power for operating the transponder's other circuitry. Alternatively, the RFID transponder 120 may utilize a power source (i.e., a battery) interconnected to the RFID IC 122.

The RFID IC 122 may be coupled to an antenna 124 which provides a means by which the transponder 120 senses the interrogating field (and/or, where appropriate, a programming field). The antenna 124 also serves as the means of transmitting the transponder response to interrogation.

The RFID transponder 120 is preferably inserted within the housing 112 of the media 100. This prevents removal of the RFID transponder 120 without physically altering (e.g., causing damage to) the housing 112 or magnetic tape 118 (i.e., opening the housing 112, cracking or breaking the housing 112, cutting and splicing the magnetic tape 118, etc.). Typically, such physical alteration will be observable upon inspection (i.e., a seal on the housing 112 will be broken, etc.) or will render the media 100 unusable (e.g., unplayable).

Referring now to FIGS. 1, 2, 3, and 4, the RFID transponder 120 may be preassembled and positioned within the housing 112. For example, the RFID IC 122 may be mounted to a substrate 140 and bonded to the antenna 124. Typical substrate materials include polyester, polyimide, ceramics, FR-4 circuit board material, etc. The RFID IC 122 and antenna leads 142 may be coated with an encapsulant, such as a "glob-top" epoxy, or the like and or laminated with a laminate to protect the circuit 122 (and bonds between the antenna 124 and circuit 122) from damage due to environmental contaminants or handling. Alternatively, the RFID IC 122 may be encapsulated within a conventional plastic-molded package (not shown) such as a single in-line package (SIP), dual in-line package (DIP), or flat pack. Such packages are well known to the art and typically include a plurality of external leads or pins which interconnect the RFID IC 122 to the antenna 124 (and other circuits or elements mounted to the substrate 140).

Figure 2:
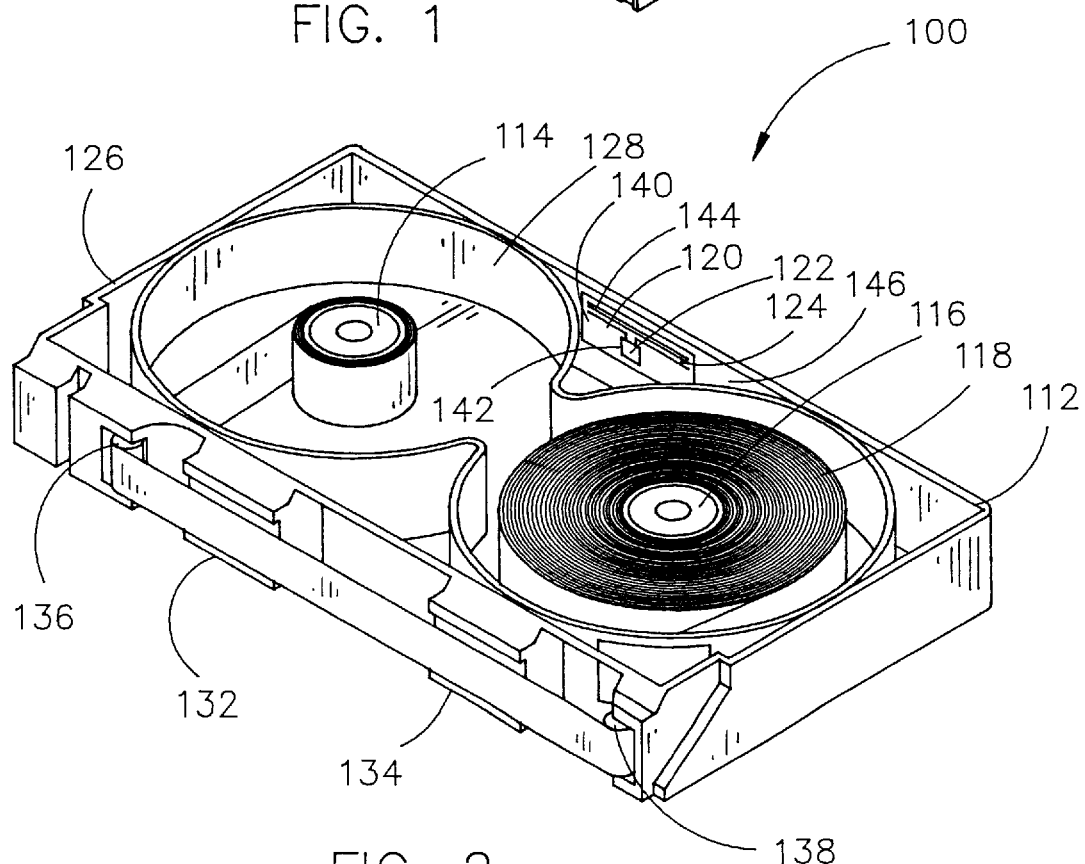
FIG. 2 is partial cross-section isometric view of the video cassette tape shown in FIG. 1.

The antenna 124 may be integrally formed on the substrate 140. Preferably, the antenna 124 consists of a thin pattern (typically 18 to 35 micron thick) formed of a conductive metal such as copper. This pattern may be formed by plating or adhering or screening a thin layer of copper (or other conductive metal) onto to the substrate 140. The layer is then be etched to form the specific geometric configuration of the antenna 124 (a dipole antenna is shown in FIG. 2; however, any antenna configuration, i.e., dipole, folded dipole, loop, coil, spiral, meander, patch, etc., may be formed). Similarly, one or more impedance adjustment elements 144 may be integrally formed on the substrate 140 to modify the impedance of the antenna 124. The impedance adjustment elements 144 may be lumped circuit elements, distributed microwave circuit elements, or parasitic elements that are electromagnetically coupled to the antenna (i.e., not electrically connected).

The antenna 124 may further include a conductive ground plane (not shown) if required (note the dipole antenna shown in FIG. 2 typically does not require a ground plane). The conductive ground plane may comprise a layer of a conductive metal (e.g., copper) formed (i.e., by plating, adhering or screening, etc.) on the side of the substrate 140 opposite the pattern.

Optimum positioning of the RFID transponder 120 within the housing 112 will vary according to the type of antenna 124 used. For example, for RFID transponders 120 having certain types of antennas 124, such as the dipole or meander dipole antennas shown in FIGS. 1 through 4, it may be desirable to place the RFID transponder 120 within housing 112 so that it is positioned as far away from the magnetic tape 118 and any metallic parts of the cassette 126 as possible. This is possible in part because the RFID transponder 120 may have an extremely small form factor (i.e., the RFID transponder may have nominal dimensions on the order of: 0.25 mm (thickness)×7 mm (width)×28 mm (length)). The antenna 124 of the RFID transponder 120 may be tuned to achieve an optimum read/write range or distance. Alternatively, for RFID transponders 120 having antennas 124 such as patch antennas, dipole over ground plane antennas (DOG), etc., it may be desirable to position the RFID transponder 124 near the magnetic tape 118 so the tape may function as a ground plane, reflecting surface, loading element, or the like.

Figure 3:
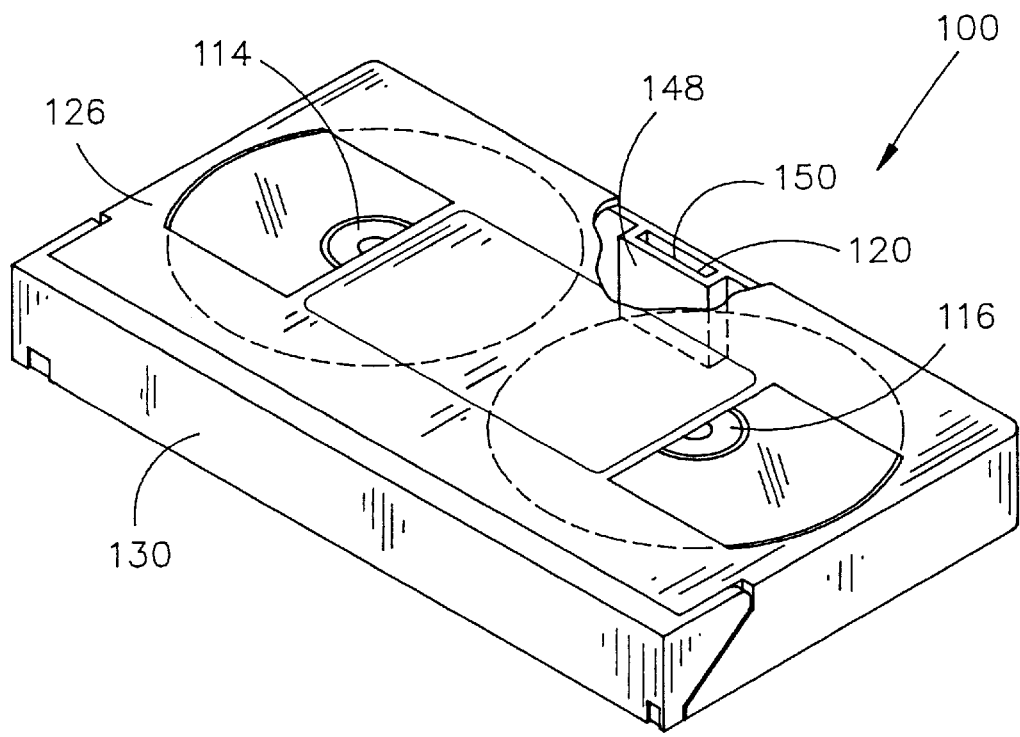
FIG. 3 is a partial cross-sectional isometric view of a video cassette tape having an RFID transponder embedded within its housing.
Figure 4:
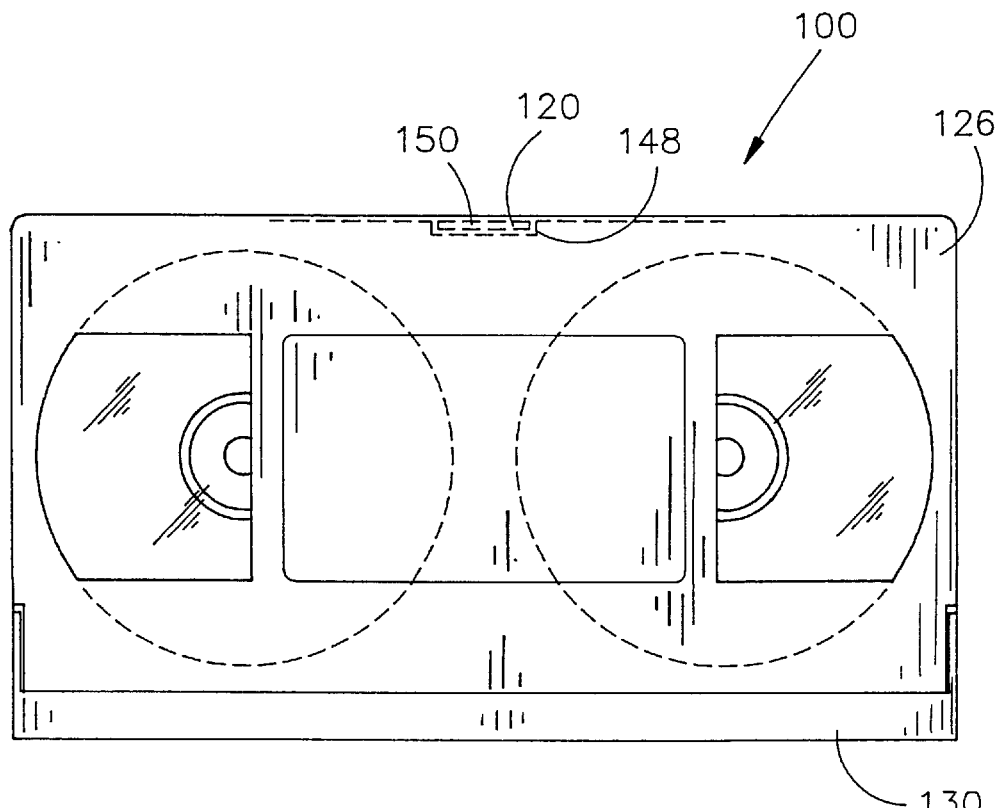
FIG. 4 is a top plan view of the video cassette tape shown in FIG. 3.

As shown in FIGS. 1 and 2, the RFID transponder 130 may be fastened to an interior surface 146 of the housing 112. Suitable fasteners include adhesive, rivets, screws, and the like. Alternatively, as shown in FIGS. 3 and 4, the RFID transponder 120 may be embedded within a wall 148 of the housing 112. For example, a slot 150 may be formed in the rear wall of the housing 112 when the housing 112 is molded. The preassembled RFID transponder 120 may then be inserted within the slot 150 as the cassette 126 is assembled. Preferably, the RFID transponder 120 is sealed within the slot 150 by a suitable encapsulant, so that it may not be removed without physically altering the housing 112. Similarly, the RFID transponder 120 may be injection molded within housing 112 when the housing 112 is formed.

Figure 5:
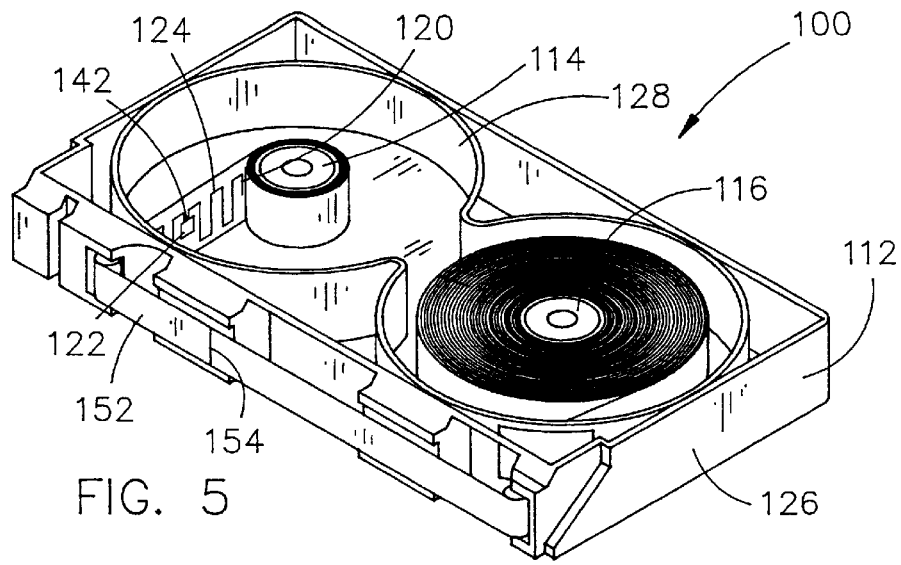
FIG. 5 is a partial cross-sectional isometric view of a video cassette tape having an RFID transponder within the leader of the magnetic tape.
Figure 6:
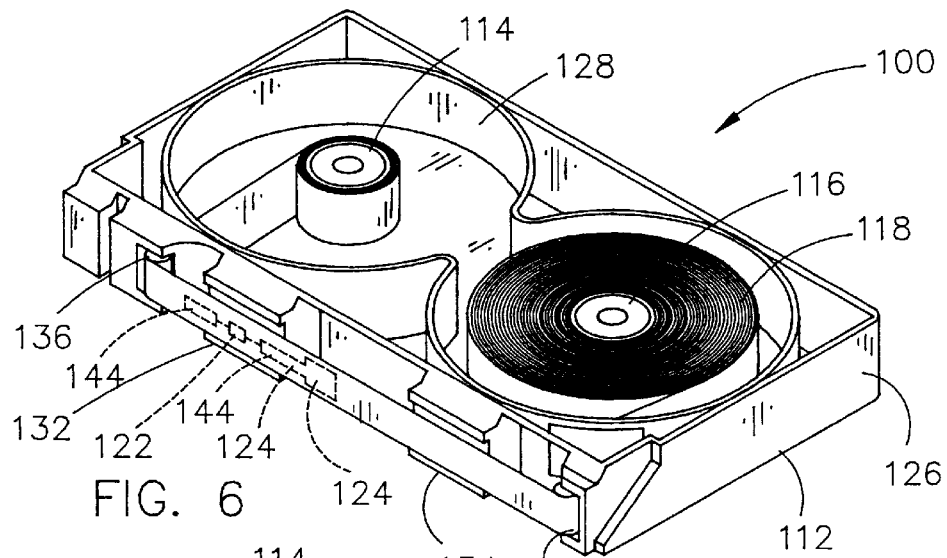
FIG. 6 is a partial cross sectional isometric view of a video cassette tape having an RFID transponder formed on the magnetic tape wherein the metallized surface of the magnetic tape is utilized as the conducting ground plane of the antenna.
Figure 7:
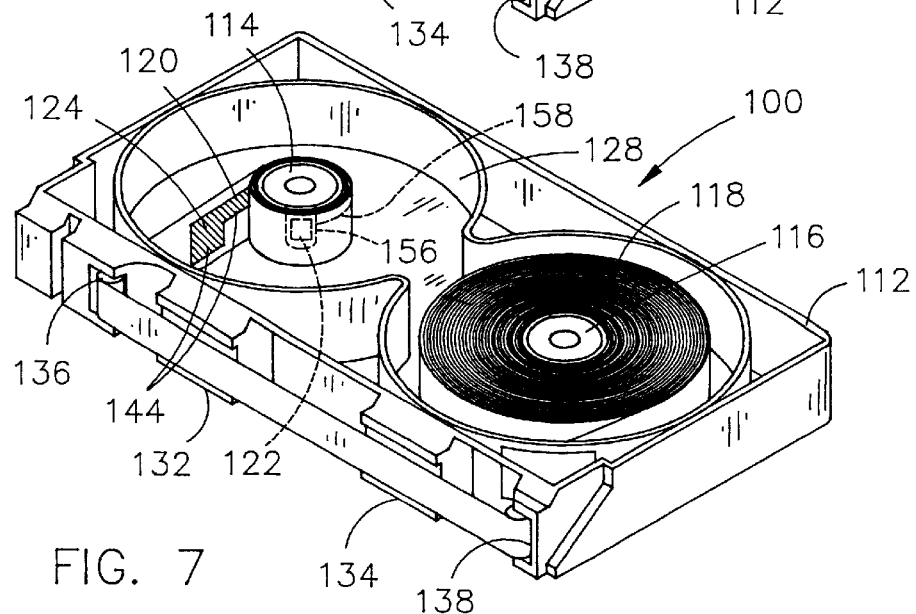
FIG. 7 is a partial cross sectional isometric view of a video cassette tape having an RFID transponder integrated therein wherein the transponder's RFID IC is placed on the tape spool and interconnected to an antenna formed on the magnetic tape.

Turning now to FIGS. 5, 6, and 7, the RFID transponder 120 may be at least partially formed on the magnetic tape 118. Preferably, the RFID transponder 120 is formed on the side of the tape 118 opposite the metallized coating (e.g., opposite the side of the tape 118 which contacts the playback and/or recording heads cassette player/recorder, camcorder, etc.) so it does not interfere with playback or recording functions. The antenna 124 (and impedance adjustment elements 144) may consist of a thin pattern (typically 18 to 35 micron thick) formed of a conductive metal such as copper. This pattern may be formed by plating or adhering or screening a thin layer of copper (or other conductive metal) onto to the tape 118. The layer is then etched to form the specific geometric configuration of the antenna 124 and impedance adjustment elements 144 (a meander dipole antenna is shown in FIG. 5 while a patch antenna is shown in FIGS. 6 and 7; however, any antenna configuration, i.e., dipole, folded dipole, loop, coil, spiral, meander, patch, etc., may be formed).

As shown in FIGS. 5 and 6, the RFID IC 122 may be mounted to the tape 118 utilizing a suitable adhesive and bonded to the antenna 124. The RFID IC 122 and antenna leads 142 may be coated with an encapsulant, such as a "glob-top" epoxy, or the like and or laminated to protect the RFID IC 122 and bonds between the RFID IC 122 and antenna 124 or impedance adjustment elements 144 (e.g., impedance matching circuits) from damage due to environmental contaminants or handling. The magnetic tape 118 may include blank sections commonly referred to as "leaders" 152 spliced to one end or both of its ends 154 (e.g., attaching the magnetic tape 118 to each spool 114 & 116). Typically, such leaders 152 lack the metallized layer (e.g., ferric oxide or the like) formed on the remainder of the magnetic tape 118. In an exemplary embodiment of the invention, shown in FIG. 5, an RFID transponder 120 may be integrally formed on each (or alternatively only one) leader 152. The leader 152 thus functions as a substrate for holding the components of the transponder 120 (e.g., RFID IC 122, antenna 124, impedance adjustment elements 140, etc.). Alternately, as shown in FIG. 6, the RFID transponder 120 may be at least partially formed on the metallized section of the magnetic tape 118. In this manner, the metallized magnetic coating of the tape 118 may form the conducting ground plane of the antenna 124 (such as the patch antenna shown in FIG. 6).

As shown in FIG. 7, the RFID IC 122 may alternatively be mounted to a spool 114 and bonded to the antenna 124. A small recess 156 may be formed on the surface of the spool 114. The RFID IC 122 is mounted within the recess 156 so that it is substantially flush with the surface of the spool 112. Preferably, the RFID IC 122 is bonded to the antenna 124 integrally formed on the tape 118 via a circuit 158. In this manner, the RFID IC 122 does not cause a bump to be formed in the magnetic tape 118 as it is wound onto the spool 114. Such bumps may wear or damage the tape 118 after extended use.

It should be appreciated that wherein RFID transponders 120 are formed on or near each leader 152 or end of the magnetic tape 118, as shown in FIGS. 5, 6 and 7, and the magnetic tape 118 is fully wound onto one spool (e.g., either spool 114 or spool 116), one RFID transponder 120 will be fully covered by the bulk of the magnetic tape 118 while the other RFID transponder 120 will be fully exposed within the chamber 128 (e.g., uncovered). As a result, the RF performance of one RFID transponder 120 may be significantly degraded (because it is covered by the magnetic tape 118) while the RF performance of the other will remain relatively unaffected (because it is uncovered). An external system (see for example FIG. 9) may attempt to interrogate each RFID transponder 120 to determine if the tape 118 has been rewound based on the characteristics of the return signal received (or not received) from each transponder 120. For example, if a normal return signal is received from a first of the RFID transponders 120 and a degraded or no return signal is received from the other (not shown), the external system will determine that the tape 118 has been rewound (shown). However, if degraded return signals are received from both RFID transponders, or a degraded return signal is received from the first transponder 120 and a normal return signal is received from the second transponder (not shown), the external system will determine that the tape 118 has not been rewound. This information may then be used by the external system to automatically cause the cassette tape to be rewound (and possibly cause the customer to be billed for rewinding the tape 118).

Figure 8:
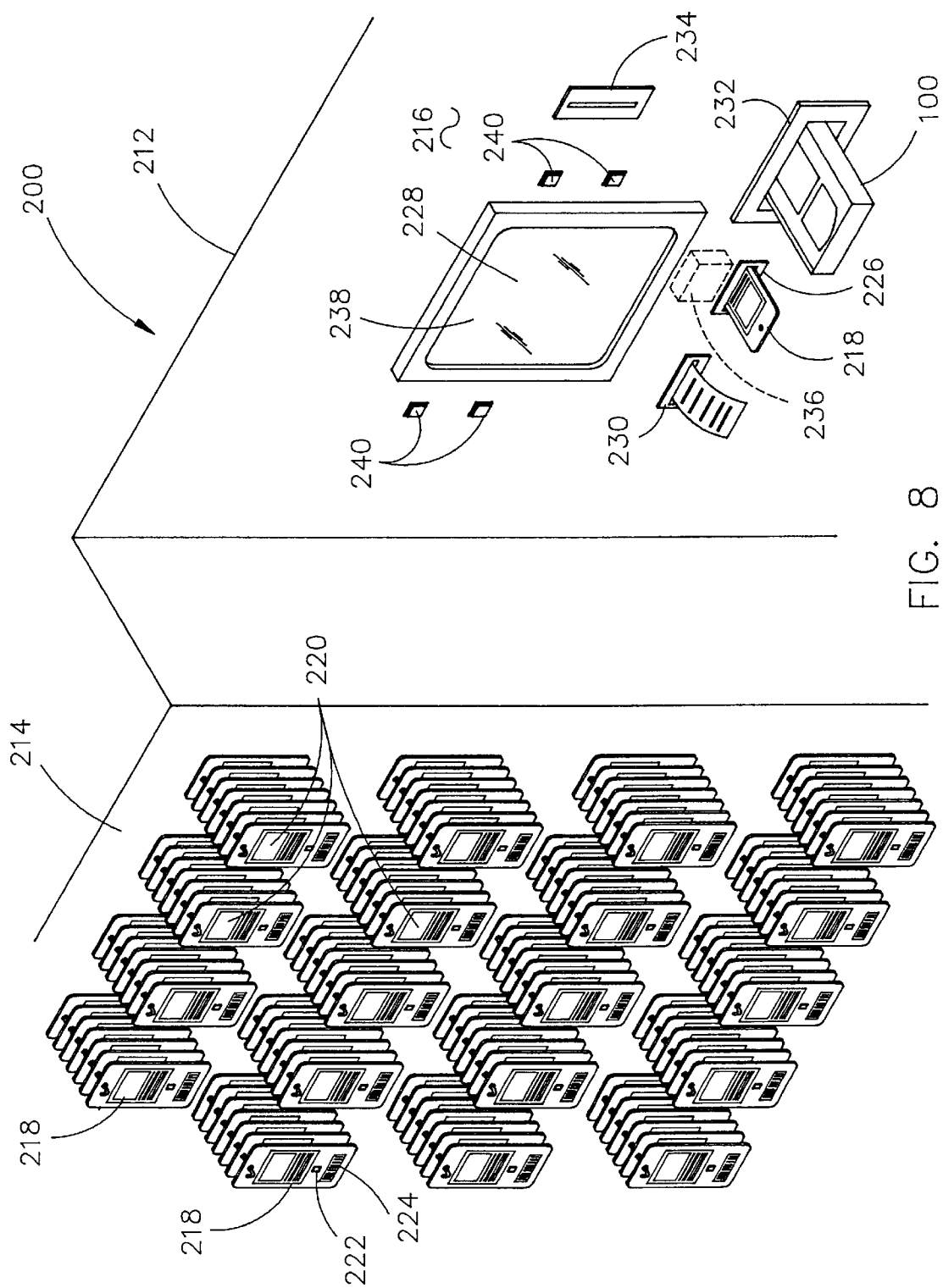
FIG. 8 depicts a media rental facility of an automated video rental system.
Figure 9:
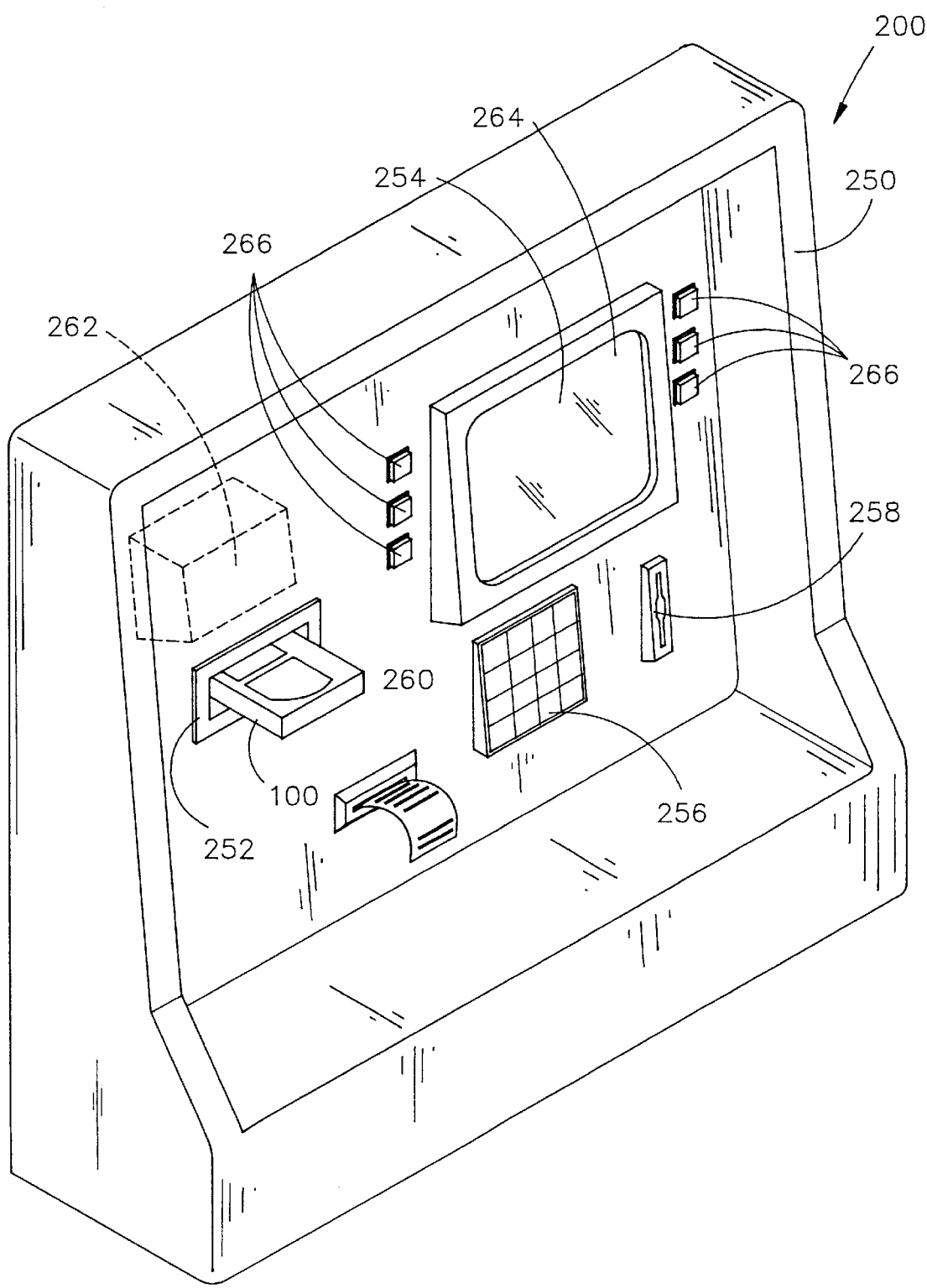
FIG. 9 depicts a return station of an automated video rental system.
Figure 10:
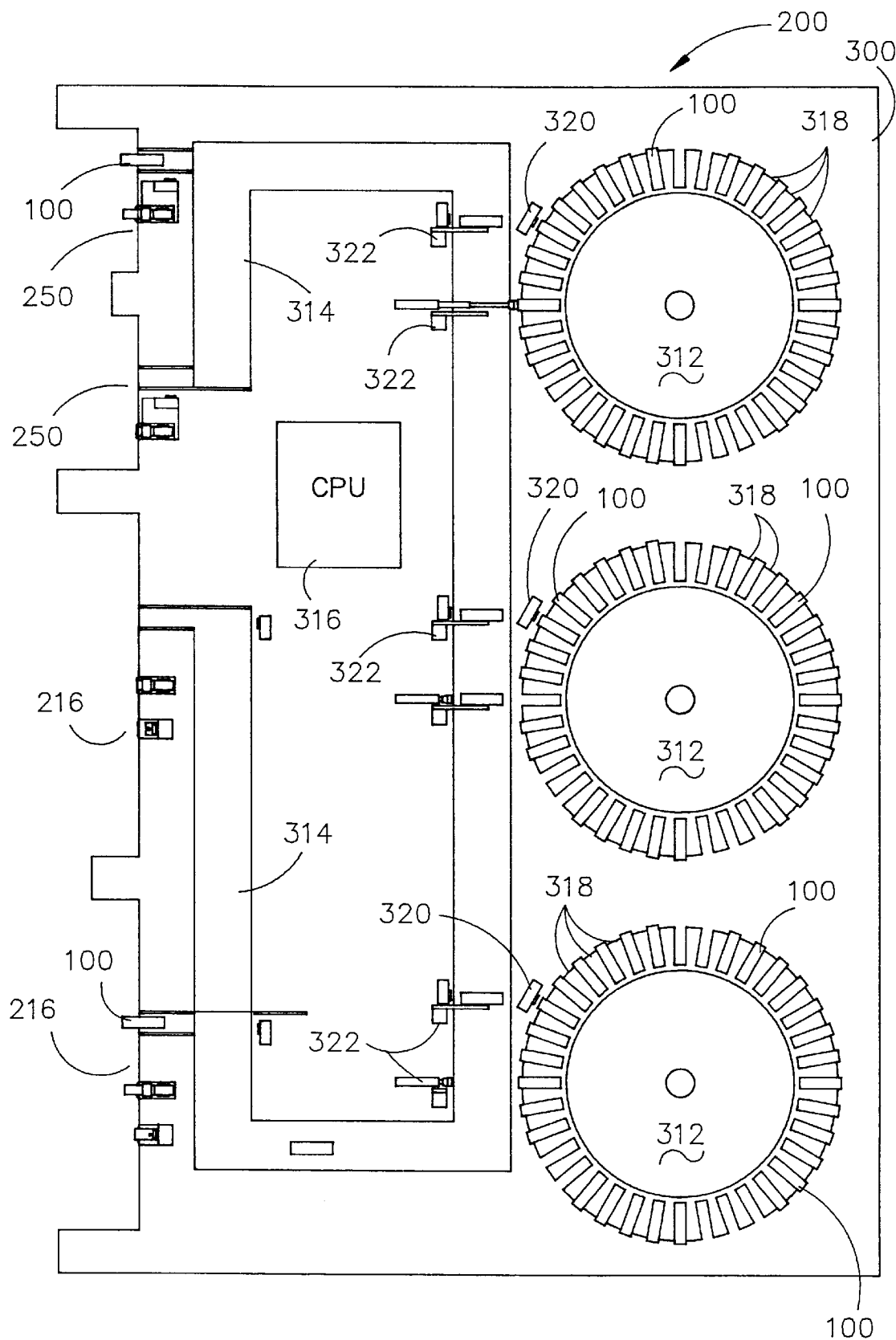
FIG. 10 is a schematic diagram of an exemplary automated video rental system.

Turning now to FIGS. 8, 9 and 10, an automated system for renting or loaning media (i.e., videos, games, music, etc.) in accordance with the present invention is shown. The system 200 employs radio frequency identification (RFID) to improve service quality, reduce the operation cost, and increase patron or customer satisfaction in library or rental environments (i.e., a public library, corporate library, video rental store, etc.). The system 200 also facilitates efficient tracking of loan or rental of the media 100 to patrons or customers [hereinafter customer(s)] and maintenance of an accurate inventory of the number of and types of media 100 possessed.

An exemplary automated media rental facility 212 is illustrated in FIG. 8 (and FIG. 10). Preferably, the media rental facility 212 comprises a selection area 214 and a checkout area 216. The selection area 214 may include a conventional display comprising a plurality of cards or slips [hereinafter media cards] 218 which correspond to the various media possessed by the facility 212 for rental. The media cards 218 may be arrayed according to subject matter (i.e., the cards 218 may be arranged alphabetically by title, author, subject category, etc.). Duplicate media cards 218 may be provided for each copy of a particular subject possessed. Preferably, each media card 218 is imprinted with a graphic 220 advertising and/or describing the subject matter contained by the corresponding media 100 (i.e., movies, music, video games, computer software, etc.). Each media card 218 may further be provided with a machine readable device such as an RFID transponder 222 (or, alternatively, a bar code 224) which is interrogated by the system 200 to automatically retrieve the selected media 100. A customer may select media 100 to be rented or borrowed by removing the card or cards 218 imprinted with the graphic 220 corresponding to his or her choice from its holder in the selection area 214 and taking the card to the checkout area 216.

The checkout area 216 may include a media card reader 226 for reading the media cards 218 selected by the customer, a display 228 for displaying information about the rental or loan transaction, a printer 230 for printing a customer receipt, a slot 232 through which the selected media 100 is supplied to the customer, and a magnetic card reader 234 for reading membership cards, debit or credit cards, etc. After selecting one or media cards 218 from the selection area 214, the customer must identify himself to the system 200. This may be accomplished by inserting a membership card (not shown) into the magnetic card reader 234, or, alternatively by entering a personal identification code via a keypad or keyboard (not shown). The customer may then insert the media cards 218 he or she has selected into the media card reader 226. An RFID interrogator (or alternatively a bar code reader) 236 may interrogate the RFID transponder 222 (or read the bar code 224) attached to (or printed on) each inserted media card 218 to identify the specific media 100 selected by the customer. Preferably, the media cards 218 are collected within the card reader 226 to be disposed of at a later time or re-stocked when the selected media 100 is returned. The display 228 may display information such as a listing of the media 100 (preferably, including title, cost, return date, etc.) selected by the customer, the customer's account status, and the like. Further, the display 228 may include a touch sensitive overlay 238 and/or a plurality of perimeter keys 240 so the customer may, for example, confirm his or her selections, choose a method of payment, or enter requested information by selecting messages displayed on the display 228. Upon completion of the rental or loan transaction, the selected media 100 is provided to the customer via slot 232 and a customer receipt is printed by the printer 230.

An exemplary automated media return station 250 of the system 200 is illustrated in FIG. 9 (and FIG. 10). The media return station 250 includes a receptacle 252 for receiving returned media, a display 254 for displaying information to the customer, a keypad 256 for accepting information from the customer, a magnetic card reader 258 allowing the media rental to be paid for via debit or charge card, and a printer 260 for printing receipts. A customer may return rented or borrowed media 100 by inserting or dropping the media into the receptacle 252. The media 100 may be stored in a container within the media return station 250 until removed and re-shelved or, alternatively automatically re-shelved via a robotic shelving apparatus (see FIG. 10). An interrogator 262 disposed within the receptacle 252 interrogates RFID transponders within the media 100 (see FIGS. 1 through 7) to determine information such as the identification (title, reference number, etc.) of the media 100, the customer to whom the media 100 was rented, the date the media 100 was to be returned, and additional charges due (i.e., late fees), whether the media's magnetic tape has been rewound (see discussion of FIGS. 5, 6 and 7, supra), and the like. This information may then be displayed to the customer via the display 254 to be confirmed. Further, the display 254 may include a touch sensitive overlay 264 and/or a plurality of perimeter keys 266 which allow the customer to, for example, confirm his or her selections, choose a method of payment, or enter requested information by selecting messages displayed on the display 254. The customer may also enter information via the keypad 256. Upon completion of the transaction, the printer 260 may print a customer receipt.

The system 200 may include robotic selecting and shelving apparatus to minimize manual operations during media selection and re-shelving operations. An exemplary embodiment of such an apparatus 300 is illustrated in FIG. 10. As shown, the robotic selecting and shelving apparatus 300 may transport media selected by a customer to one or more media checkout areas 216 (see also FIG. 8), and receive and re-shelve media returned via one or more media return stations 250 (see also FIG. 9). In an exemplary embodiment, the selecting and shelving apparatus 300 may include one or more media carriages 312, a media transport system 314, and a controller such as CPU 316. As shown in FIG. 10, each media carriage 312 may comprise a rotatable drum having a plurality of slots 318 for holding media 100 (i.e., video cassette tapes, audio cassette tapes, etc.). Alternatively, the media carriages 312 may comprise vertical shelves or the like. RFID interrogators 320 are positioned adjacent to each media carriage 312. The RFID interrogators 320 identify media 100 stored on the media carriage 312 by interrogating RFID transponders integrated within the media 100 (see FIGS. 1 through 7). A media retrieval/return mechanism 322 such as a robotic arm or the like may retrieve media 100 from the media carriage 312 and place the media 100 in the transport system 314 to be delivered to a checkout area 216. Similarly, the mechanism 322 may receive media 100 from the media return station 250 via the transport system 314 and return the media 100 to the media carriage 312. The controller or CPU 316 is preferably interconnected to the media checkout area 216 and media return station 250 so that it may control and integrate operation of the system 200. The CPU 316 may, for example, receive a request for selected media 100 entered by the customer at the checkout area 216. Selected media 100 is then located on the media carriages 312 via the RFID interrogators 320 and retrieved via the media retrieval/return mechanism 322. The media 100 is placed in the transport system 314 where it is delivered to the customer at the checkout area 216. Similarly, the CPU 316 may control return of media 100 to the media carriages 312. Preferably, the CPU 316 may store information about the media 100 such as rental status of the media 100, date media 100 is to be returned, customer media to which media 100 is rented, charges owed by that customer, etc. to a database. This database may provide inventory and status information for all media 100 possessed within the system 200.

FIGS. 8, 9 and 10 illustrate an exemplary embodiment of the system 200 configured for the rental of prerecorded video cassette tapes (e.g., in a video rental store). It should be appreciated that modification of the system 200 for other environments (i.e., library, video sales, computer game rental or sales, computer software rental or sales, etc.) or use of only parts of the system 200 by one skilled in the art is anticipated and would not depart from the scope or spirit of the invention. For example, instead of a display as shown in FIG. 8, one or more computer terminals may be provided (not shown). This would reduce the amount of space required by the media rental facility and would improve access to the media by customers having handicaps. Preferably, the computer terminals would display a list of media available rental or loan. The computer terminal could also display information and advertising for each media (i.e., names of artists, short clips of movies or music, etc.). Rental or loan transactions would be accomplished electronically at the end of the selection process. Similarly, customers could select media 100 using their own computer via the Internet, a network service, or the like. Selected media could then be prepared for pickup by the customer or delivered to the customer at the customer's home.

Figure 11:
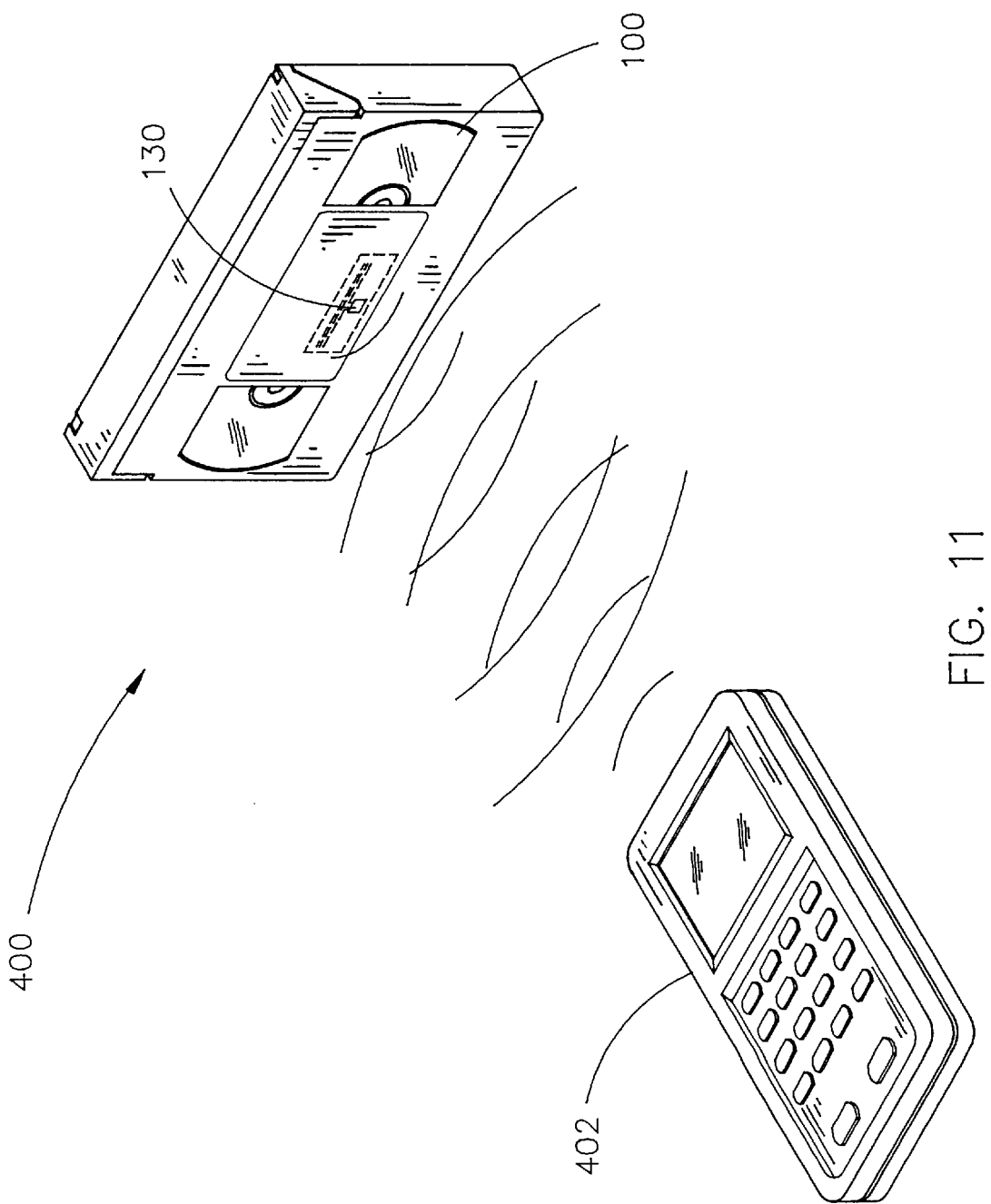
FIG. 11 is a perspective view illustrating an RFID system in accordance with the present invention.
Figure 12:
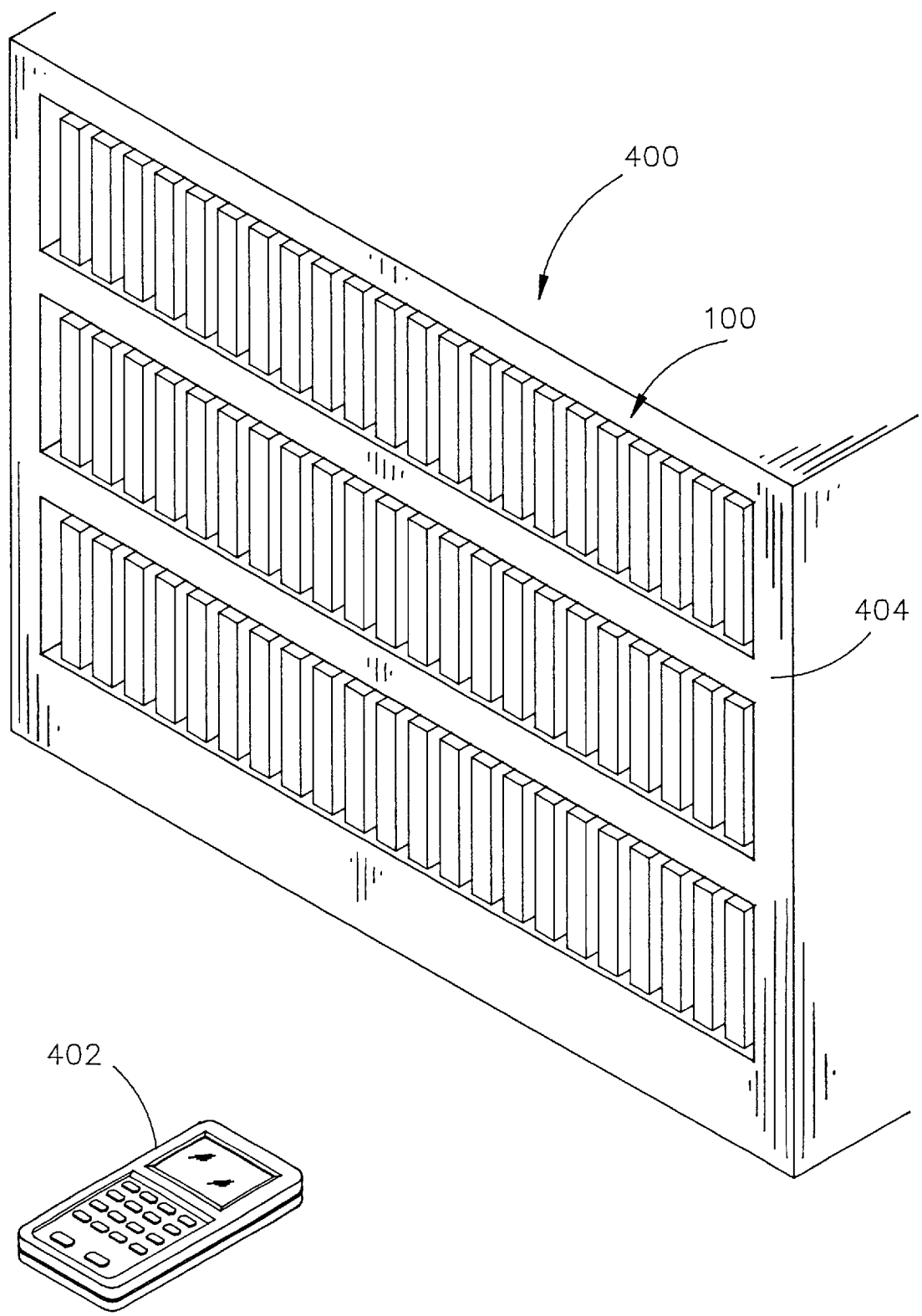
FIG. 12 is a perspective view of the RFID system shown in FIG. 11 wherein the system is employed in a video rental or library environment.
Figure 13:
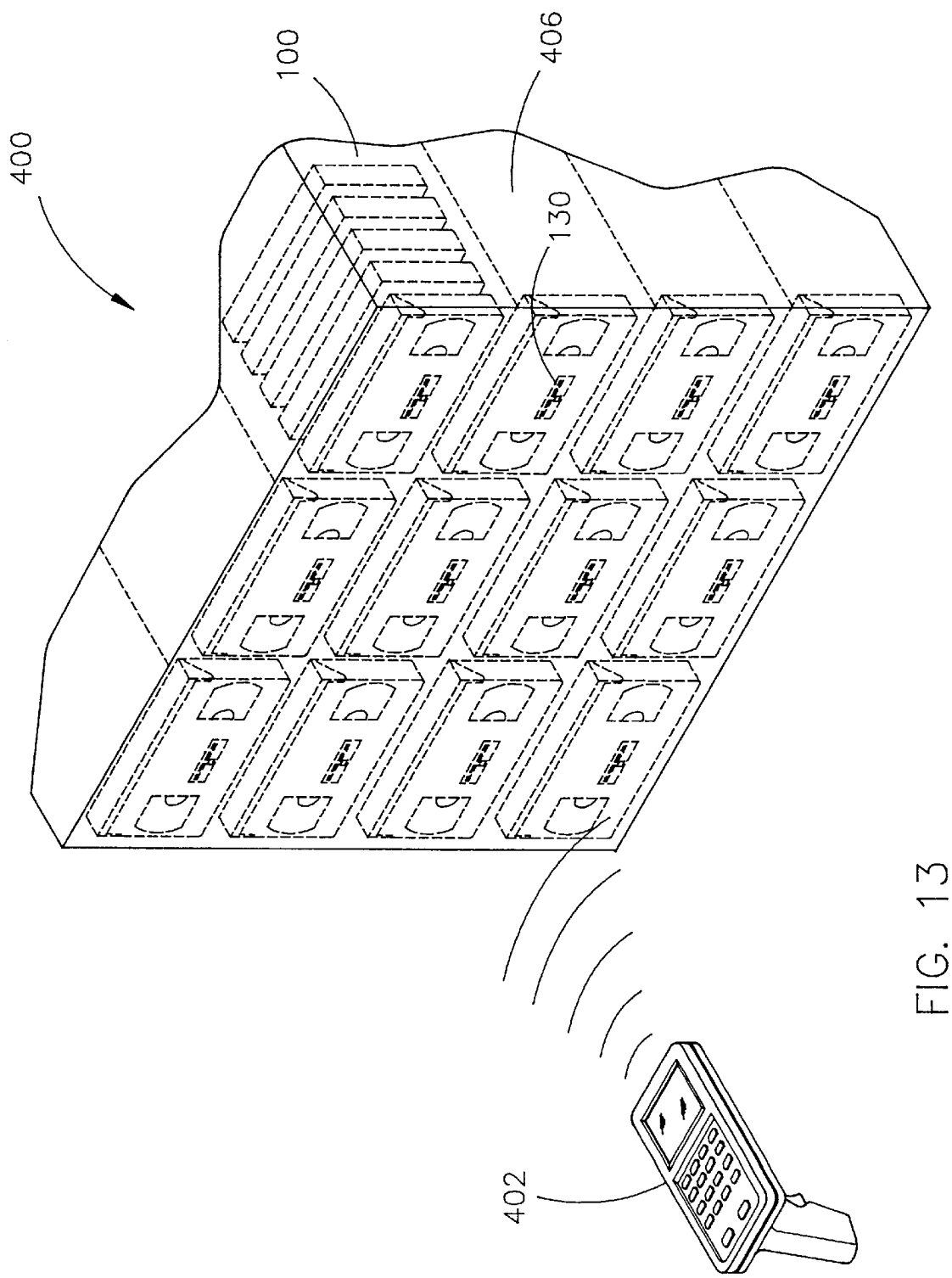
FIG. 13 is a perspective view illustrating of the RFID system shown in FIG. 11 wherein the system is used to interrogate audio cassette tapes which are crated for shipping.

Referring now to FIGS. 11, 12, and 13, an exemplary RFID system utilizing magnetic tape storage media in accordance with the present invention is shown. The RFID system 400 includes a hand-held interrogator or reader 402 (the interrogator may be part of a hand-held data terminal, portable computer, etc.) for interrogating the RFID transponder 130 contained within the media 100. The interrogator 402 may, for example, communicate a request for data contained within the transponder's memory. Preferably, the RFID transponder 130 responds to the transmitted request by communicating the requested information. The information may then be decoded by the interrogator 402 to provide functions desired by the user (i.e., video cassette tape rental and sales functions including inventory, rental checkout and return, screening for counterfeit or stolen tapes, etc.).

As shown in FIG. 11, the RFID system 400 may be used in point-of-sale applications. Inventory information stored in the memory of the RFID transponder 130 may be read by the interrogator 402 and used during sale, rental or loan transactions to a customer or patron. The information may, for example, be used to automate the transaction and/or provided to a central computer system to update inventory information.

As shown in FIGS. 12 and 13, the RFID system 400 may be used in a retail, rental, or library environments. The RFID transponder 130 of each media 100 may be programmed with inventory information identifying the media 100 (i.e., content, serial number, inventory number, price, etc.). The interrogator 402 may interrogate each tape's transponder 130 to retrieve this information. In this manner, the media 100 may be inventoried without being physically handled (e.g., removed from the shelf 404 as shown in FIG. 12 or unpacked from a shipping crate 406 as shown in FIG. 13). The inventory information may similarly be utilized to locate a particular video cassette tape from a group of tapes.

The interrogator 402 may also be capable of writing or programming information to the memory of the RFID transponder 130. For example, the RFID transponder 130 may be preprogrammed with a code which would disable playback of the media 100 when played by a VCR (audio cassette player, computer tape drive, etc.). The interrogator 402 may, at the time of sale, erase this code from the RFID transponder 130 so that the customer may play the media 100 after purchase or rental. Alternatively, the interrogator 402 may write a code to the RFID transponder 130 which would allow playback of the media 100. In this manner, theft or counterfeiting of RFID equipped media 100 would be deterred since the stolen or copied discs could not be played.

Figure 14:
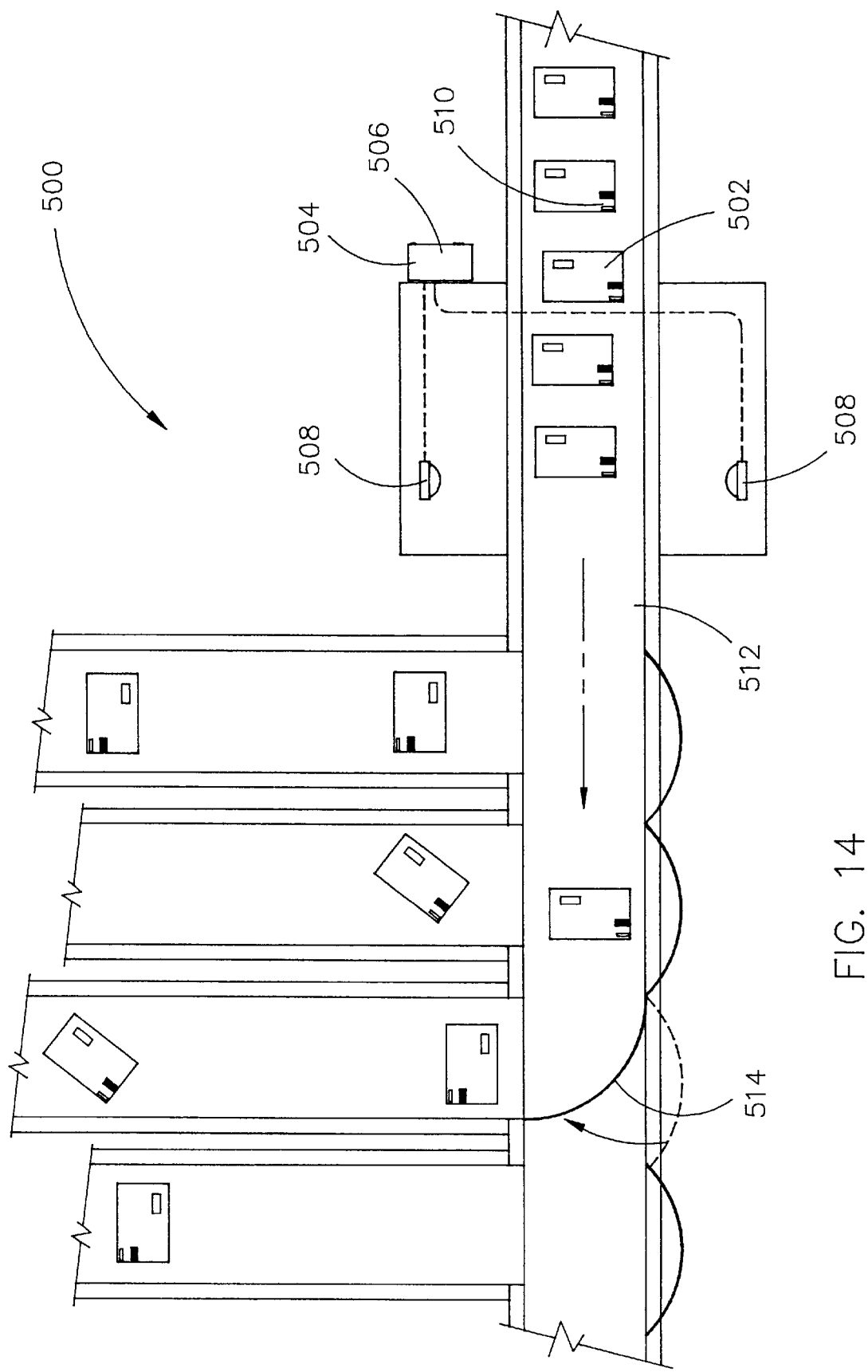
FIG. 14 is a top plan view of an RFID system used in a shipping environment.

Referring now to FIG. 14, an RFID system 500 may be capable of automatically sorting crates or packages 502 containing magnetic tape storage media such as video cassette tapes of the present invention. The RFID system 500 may also automatically verify the contents of each crate 502, enable/disable the RFID transponders of each tape contained within the crate 502, etc., by reading information from (and/or writing or programming information to) the RFID transponder of the tapes contained within the crate 502.

The RFID system 500 includes a controller or base station 504 comprising an RF transceiver 506 coupled to one or more RF antennas 508. The base station 504 may interrogate RFID transponders embedded within labels 510 adhered to the crates 502 as they are carried along the system's primary conveyor mechanism 512 past the antennas 508. Memory contained by such RFID transponders may be programmed with destination and routing information for the crate 510 to which it is attached. The base station 504 may process this information so that the crate 510 may be automatically sorted and routed to the appropriate destination. This may be accomplished, in an exemplary embodiment, by temporarily closing a gate 514 across the primary conveyor mechanism 512. The gate 514 causes the crate 502 to be diverted onto a secondary conveyor mechanism 516 corresponding to the destination and routing information contained within the RFID transponder of the label 510.

Similarly, the base station 504 may also interrogate and/or program the RFID transponders of each tape contained within the crate 502 (see FIG. 13). The tapes' RFID transponders may, for example, be programmed with information identifying the tape (i.e., title, author, content, serial number, inventory number, price, etc.). The base station 504 may interrogate each tape's transponder to retrieve this information without physically handling the tape (e.g., removing it from the shipping crate 502). The base station 504 may then use the information to verify whether each crate contains the proper number and type of tapes.

The base station 504 may also be capable of writing or programming information to the memory of the RFID transponder of each tape within the crate 502. For example, the base station 504 may program the transponder with inventory information for use by customers (i.e., serial number, title, index information, etc.). Similarly, the base station 504 could program the transponder with a code, password, etc. which would enable playback of the tape when played by an RFID equipped VCR or audio cassette player. Stolen or counterfeited tapes would lack this coded information and thus could not be played.

It is believed that the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A magnetic tape storage media, comprising:
   a housing having at least one spool;
   a length of magnetic tape wound onto the spool, said magnetic tape having a magnetic coating disposed thereon for storing information; and
   a radio frequency identification (RFID) transponder integrally contained within said housing for communicating with an external system, wherein said RFID transponder is integrally formed on said magnetic tape.

2. The magnetic tape storage media according to claim 1, wherein said RFID transponder comprises an antenna formed on said magnetic tape and a radio frequency identification integrated circuit (RFID IC) adhered to said magnetic tape and bonded to the antenna.

3. The magnetic tape storage media according to claim 2, wherein said RFID transponder further comprises an impedance adjustment element for adjusting the impedance of the antenna.

4. The magnetic tape storage media according to claim 2, wherein the metallized magnetic coating of said magnetic tape forms a conductive ground plane for the antenna.

5. The magnetic tape storage media according to claim 1, wherein said magnetic tape includes at least one leader, and wherein said RFID transponder is at least partially formed on the leader.

6. A magnetic tape storage media, comprising:
   a housing having at least one spool;
   a length of magnetic tape wound onto the spool, said magnetic tape having a magnetic coating disposed thereon for storing information; and
   a radio frequency identification (RFID) transponder integrally contained within said housing for communicating with an external system, wherein said RFID transponder comprises an antenna formed on said magnetic tape and a radio frequency identification integrated circuit (RFID IC) adhered to the spool and interconnected to the antenna.

7. The magnetic tape storage media according to claim 6, wherein the spool included a recess formed therein and the RFID IC is contained within the recess.

* * * * *